May 6, 1941.   J. J. GALL   2,241,301

FISHHOOK

Filed Nov. 12, 1940

J. J. Gall
INVENTOR.

BY *CA Snowles*

ATTORNEYS.

Patented May 6, 1941

2,241,301

UNITED STATES PATENT OFFICE 2,241,301

FISHHOOK

Jacob Jay Gall, Punta Gorda, Fla.

Application November 12, 1940, Serial No. 365,360

5 Claims. (Cl. 43—27)

This invention relates to fishhooks, one of the objects being to provide a means whereby it becomes impossible for a fish, after being caught, to work loose from the hook.

Another object is to provide a fishhook with a latch of novel construction which can be applied to lures of the spoon type and will not interfere with the action of the hook while being used for fishing.

A still further object is to provide a latching means which is simple and compact in construction as well as efficient in operation.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1:
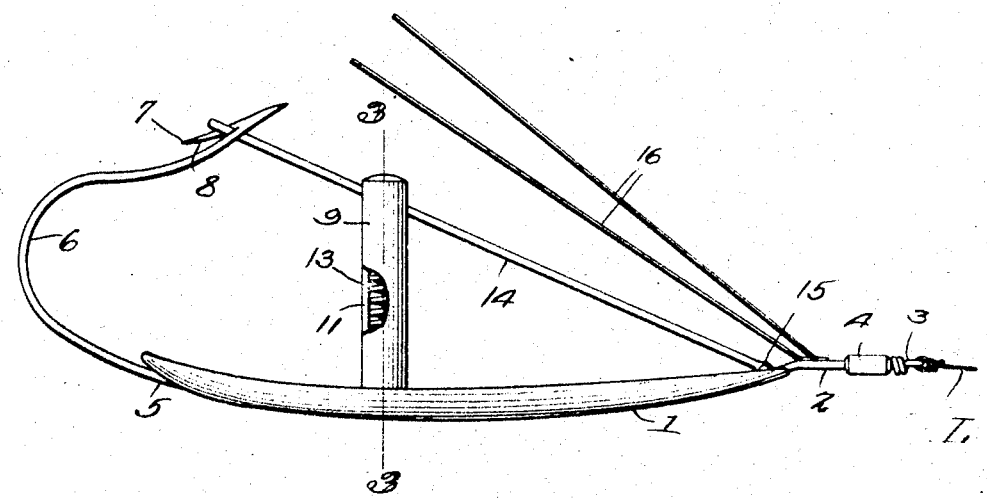
Figure 1 is a side elevation of a lure of the spoon type provided with the present improvements, a portion being broken away.
Figure 2:
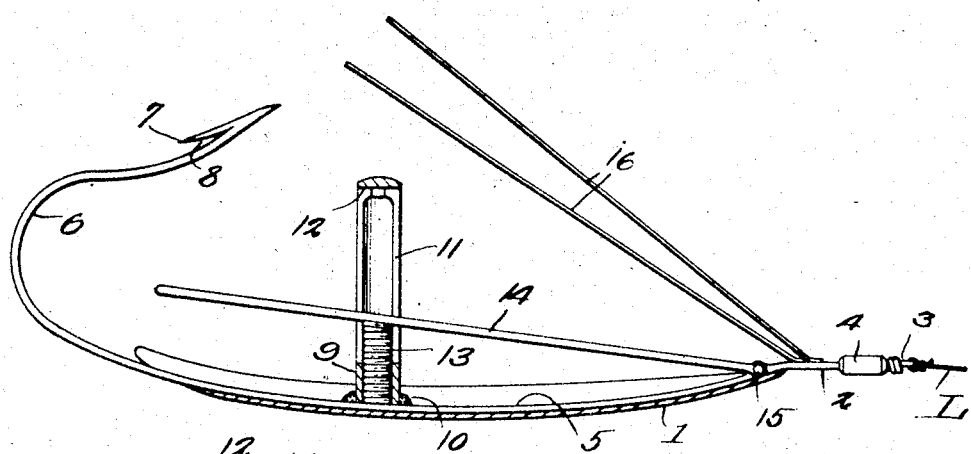
Figure 2 is a vertical longitudinal section, the latch being shown pressed out of normal position while a fish is being hooked.

Referring to the figures by characters of reference, 1 designates a lure of the spoon type from one end of which is extended a stem 2 which is fixedly joined to the lure and has an eye 3 connected thereto by a swivel joint 4. This eye is adapted to be engaged by one end of a line L.

Stem 2 can be complete in itself or, if preferred, and as shown in the drawing, can be made up of one end of the shank 5 of a fishhook, this shank being extended along the center of and soldered or otherwise joined to the lure while the hook portion 6 is extended beyond one end of the lure and has a laterally extended barb 7 cooperating with the adjacent portion of the hook to form a crotch 8.

A post 9 is mounted on the lure and is substantially perpendicular thereto, this post being held fixedly in position in any suitable manner as by means of solder 10. The post has a longitudinal slot 11 extending therethrough, this slot being closed at both ends so that a stop or abutment 12 is formed by one end wall of the slot.

Figure 3:
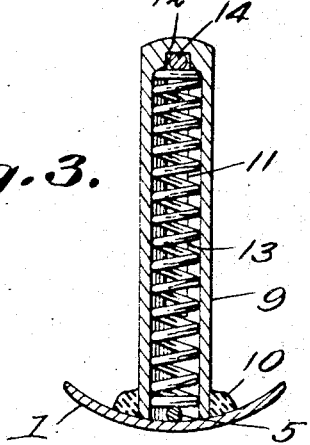
Figure 3 is an enlarged section on line 3—3, Figure 1.

A coiled spring 13 is seated in the post and bears at one end against a latch in the form of elongated stiff wire the front end of which is pivotally connected to the lure as shown at 15. This latch is held normally pressed against the stop 12 by the spring 13, as shown particularly in Figures 1 and 3 and when it is thus located, the free end portion of the latch is seated in the crotch 8 as shown in Figure 1.

The lure can be provided with the usual weed guards or fingers 16.

Under normal conditions, and as before stated, the latch 14 is seated in the crotch 8. When a fish takes the hook 6 it presses the latch toward the lure 1 and against the action of spring 13 as the hook penetrates the head of the fish. As the head slips along the hook it finally moves past the end of the latch 14 which thus is released and will promptly snap back to position against the stop or abutment 12 so that the latch thus prevents the hook from being withdrawn accidentally from engagement with the fish.

What is claimed is:

1. The combination with a lure having a hook fixed relative thereto, of a latch carried by the lure and normally supported yieldingly close to the point of the hook, and a guide post fixedly mounted on the lure, said latch being slidable along and limited in its movement by the post.

2. The combination with a lure having a hook fixed relative thereto, of a latch carried by the lure and normally supported yieldingly close to the point of the hook, a slotted guide post fixedly mounted on the lure, said latch being slidable along and limited in its movement by the post, and a spring in the post and bearing against the latch.

3. The combination with a lure having a hook fixed relative thereto, of a latch hinged at one end to the lure and normally positioned at its other end close to the point of the hook, a fixed post on the lure constituting a guide and stop for the latch, and yielding means for holding the latch in normal position.

4. The combination with a lure having a hook fixed relative thereto, of a latch hinged at one end to the lure and normally positioned at its other end close to the point of the hook, a fixed post on the lure constituting a guide and stop for the latch, and a spring in the post and bearing against the latch.

5. The combination with a lure having a hook fixed relative thereto, of a latch carried by the lure and normally supported yieldingly close to the point of the hook, and a guide post fixedly mounted on the lure, said latch being slidable along and limited in its movement by the post, there being a crotch at the point portion of the hook providing a seat for one end portion of the latch.

JACOB JAY GALL.